US012783798B2

(12) United States Patent
Wen

(10) Patent No.: US 12,783,798 B2
(45) Date of Patent: Nov. 3, 2026

(54) IDENTIFICATION SYSTEM AND IDENTIFICATION METHOD

(71) Applicant: VIA Technologies, Inc., New Taipei City (TW)

(72) Inventor: Cheng Yu Wen, New Taipei City (TW)

(73) Assignee: VIA Technologies, Inc., New Taipei City (TW)

( * ) Notice: Subject to any disclaimer, the term of this patent is extended or adjusted under 35 U.S.C. 154(b) by 234 days.

(21) Appl. No.: 18/664,294

(22) Filed: May 15, 2024

(65) Prior Publication Data

US 2025/0308248 A1 Oct. 2, 2025

(30) Foreign Application Priority Data

Apr. 1, 2024 (TW) ................................ 113112348

(51) Int. Cl.
*G06F 40/279* (2020.01)
*G06T 11/60* (2026.01)
(Continued)

(52) U.S. Cl.
CPC ............ *G06F 40/279* (2020.01); *G06T 11/60* (2013.01); *G06V 10/44* (2022.01); *G06V 10/774* (2022.01); *G06V 10/776* (2022.01); *G06V 20/58* (2022.01)

(58) Field of Classification Search
CPC ...... G06V 20/58; G06V 10/44; G06V 10/774; G06V 10/776; G06V 10/82; G06V 30/153;
(Continued)

(56) References Cited

U.S. PATENT DOCUMENTS

| | | | | |
|---|---|---|---|---|
| 11,978,271 | B1 * | 5/2024 | Kharbanda | G06V 20/20 |
| 12,190,060 | B1 * | 1/2025 | Tavanaei | G06F 40/169 |

(Continued)

FOREIGN PATENT DOCUMENTS

| | | | | |
|---|---|---|---|---|
| CN | 107444308 | | 12/2017 | |
| CN | 114090815 | A * | 2/2022 | G06N 3/044 |

(Continued)

OTHER PUBLICATIONS

Zhuang, Peiqin, Yali Wang, and Yu Qiao. "Learning attentive pairwise interaction for fine-grained classification." Proceedings of the AAAI conference on artificial intelligence. vol. 34. No. 07. 2020.*

(Continued)

*Primary Examiner* — Shefali D Goradia
(74) *Attorney, Agent, or Firm* — JCIPRNET

(57) ABSTRACT

An identification system and an identification method are provided. The identification system includes a storage device and a processor. The storage device stores an identification module. The identification module includes a text encoder, a computing module, and an attentive pairwise interaction network model. The processor is coupled to the storage device and executes the identification module. The processor inputs the input data to the identification module, so that the identification module generates output data according to the input data. The input data is one of text data and picture data, and the output data is the other one of text data and picture data. Encoding data output by the text encoder or the attentive pairwise interaction network model is used as the input data of the computing module. The computing module generates output data according to the input data.

16 Claims, 8 Drawing Sheets

(51) Int. Cl.

| | |
|---|---|
| ***G06V 10/44*** | (2022.01) |
| ***G06V 10/774*** | (2022.01) |
| ***G06V 10/776*** | (2022.01) |
| ***G06V 10/82*** | (2022.01) |
| ***G06V 20/58*** | (2022.01) |

(58) Field of Classification Search
CPC ........ G06F 40/279; G06F 18/00; G06T 11/60; G06N 3/0455; G06N 3/0464
See application file for complete search history.

(56) References Cited

U.S. PATENT DOCUMENTS

| | | | | |
|---|---|---|---|---|
| 2022/0116820 | A1 | 4/2022 | Avedisov et al. | |
| 2024/0265690 | A1* | 8/2024 | Anandkumar | G06V 10/82 |
| 2025/0200928 | A1* | 6/2025 | Francis | G06V 10/82 |
| 2025/0285718 | A1* | 9/2025 | Planche | G16H 15/00 |

FOREIGN PATENT DOCUMENTS

| | | | |
|---|---|---|---|
| CN | 115116030 | 9/2022 | |
| TW | 202113768 | 4/2021 | |
| WO | WO-2024206231 A1 * | 10/2024 | G06N 3/0895 |

OTHER PUBLICATIONS

Fang, Hao-Shu, et al. "Pairwise body-part attention for recognizing human-object interactions." Proceedings of the European conference on computer vision (ECCV). 2018.*
"Office Action of Taiwan Counterpart Application", issued on Jan. 14, 2025, p. 1-p. 16.

* cited by examiner

IDENTIFICATION SYSTEM AND IDENTIFICATION METHOD

CROSS-REFERENCE TO RELATED APPLICATION

This application claims the priority benefit of Taiwan application serial no. 113112348, filed on Apr. 1, 2024. The entirety of the above-mentioned patent application is hereby incorporated by reference herein and made a part of this specification.

BACKGROUND

Technical Field

The disclosure relates to a data processing technology, and particularly relates to an identification system and an identification method.

Description of Related Art

Conventional image capture devices, such as driving recorders or car camera systems, may only provide image recording functions. However, with the current increase in demand for driving assistance, how to effectively identify driving images or use driving record images to implement related driving assistance functions is currently one of the important issues in this field.

SUMMARY

The disclosure provides an identification system and an identification method that can effectively identify picture or text data.

The identification system of the disclosure includes a storage device and a processor. The storage device is used to store an identification module. The identification module includes a text encoder, a computing module, and an attentive pairwise interaction network model. The processor is coupled to the storage device and used to execute the identification module. The processor inputs input data to the identification module so that the identification module generates output data according to the input data. The input data is one of text data and picture data, and the output data is the other one of text data and picture data. The encoding data output by the text encoder or the attentive pairwise interaction network model is used as the input data of the computing module, and the computing module generates output data according to the input data.

The identification method of the disclosure includes steps as follows. The identification module is executed, in which the identification module includes the text encoder, the computing module, and the attentive pairwise interaction network model. The input data is input to the identification module, in which the input data is one of text data and picture data; and the output data is generated according to the input data through the identification module, in which the output data is the other one of text data and picture data. The encoding data output by the text encoder or the attentive pairwise interaction network model is used as the input data of the computing module, and the computing module generates the output data according to the input data.

Based on the above, the identification system and the identification method of the disclosure can effectively identify text data or picture data through the identification module, in which the identification module is constructed from a picture-text matching model and the attentive pairwise interaction network model.

In order to make the above-mentioned features and advantages of the disclosure more comprehensible, embodiments are given below and described in detail together with the accompanying drawings.

DESCRIPTION OF THE EMBODIMENTS

Figure 1:
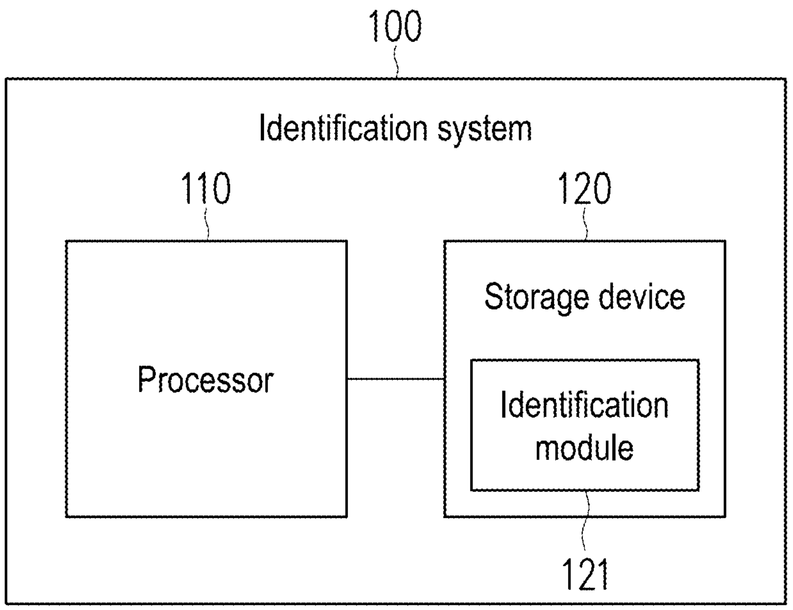
FIG. 1 is a schematic diagram of an identification system according to an embodiment of the disclosure.

In order to make the content of the disclosure more comprehensible, the following embodiments are provided as examples according to which the disclosure may be implemented. In addition, wherever possible, elements/components/steps with the same reference numerals in the drawings and embodiments represent the same or similar parts.

FIG. 1 is a schematic diagram of an identification system according to an embodiment of the disclosure. Referring to FIG. 1, an identification system 100 includes a processor 110 and a storage device 120. The processor 110 is coupled to the storage device 120. The storage device 120 stores an identification module 121. In this embodiment, the processor 110 may execute the identification module 121. The processor 110 may input input data to the identification module 121. The identification module 121 may identify input data and generate output data of an identification result. In an embodiment, if the input data is picture data (or referred to as image data), then the output data may be text data (or referred to as sentence data). In contrast, if the input data is text data (or referred to as sentence data), then the output data may be picture data (or referred to as image data).

In this embodiment, the processor 110 may be, for example, a central processing unit (CPU), or other programmable general-purpose or special-purpose microprocessors, a digital signal processor (DSP), an image processing unit (IPU), a graphics processing unit (GPU), a programmable controller, an application specific integrated circuit (ASIC), a programmable logic device (PLD), other similar processing devices, or a combination of these devices.

In this embodiment, the storage device 120 may be, for example, a dynamic random access memory (DRAM), a flash memory, or a non-volatile random access memory (NVRAM).

Figure 2:
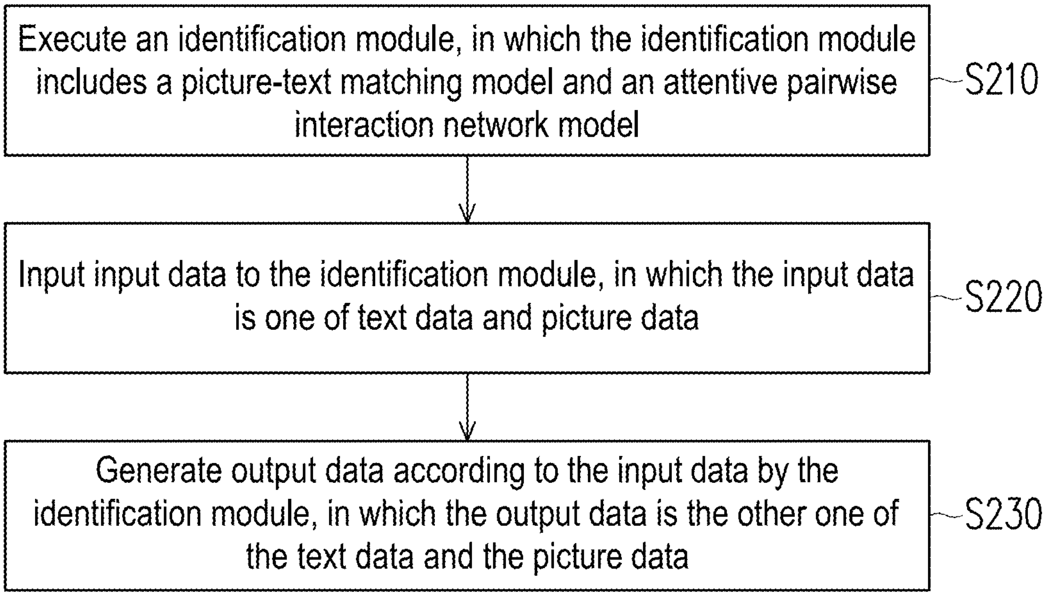
FIG. 2 is a flow chart of an identification method according to an embodiment of the disclosure.
Figure 3:
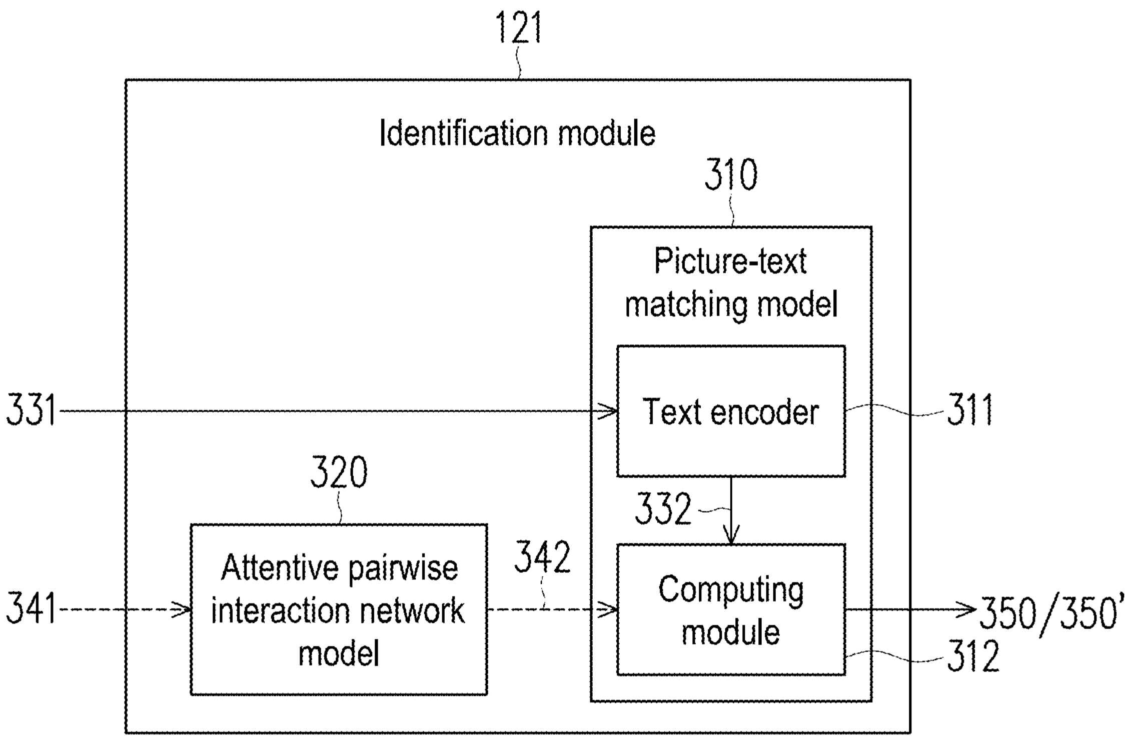
FIG. 3 is a schematic diagram of an identification module according to an embodiment of the disclosure.

FIG. 2 is a flow chart of an identification method according to an embodiment of the disclosure. FIG. 3 is a schematic diagram of an identification module according to an embodiment of the disclosure. Referring to FIG. 1 to FIG. 3, the identification system 100 of FIG. 1 may execute steps S210 to S230 as follows. In step S210, the processor 110 may execute the identification module 121, in which the identification module 121 may include a picture-text matching model 310 and an attentive pairwise interaction network (API-Net) model 320. In this embodiment, the picture-text matching model 310 may be a contrastive language-image pre-training (CLIP) model. The picture-text matching model 310 may include a text encoder 311 and a computing module 312. In step S220, the processor 110 may input input data to the identification module 121, in which the input data may be one of text data and picture data. In step S230, the identification module 121 may generate output data according to the input data, in which the output data may be the other one of text data and picture data.

Specifically, as shown in FIG. 3, if the input data is text data, then the identification module 121 may input input data 331 to the text encoder 311 in the picture-text matching model 310, and the text encoder 311 may generate encoding data 332 according to the input data 331. The encoding data 332 output by the text encoder 311 may be used as input data of the computing module 312, and the computing module 312 may generate output data 350 according to the input data (the encoding data 332). Moreover, if the input data is picture data, then the identification module 121 may input the input data 341 to the attentive pairwise interaction network model 320, and the attentive pairwise interaction network model 320 may generate encoding data 342 according to the input data 341. The encoding data 342 output by the attentive pairwise interaction network model 320 may be used as the input data of the computing module 312, and the computing module 312 may generate output data 350' according to the input data (the encoding data 342). Therefore, the identification system 100 and the identification method of this embodiment can realize effective text (or sentence) identification function and picture (or image) identification function.

Figure 4:
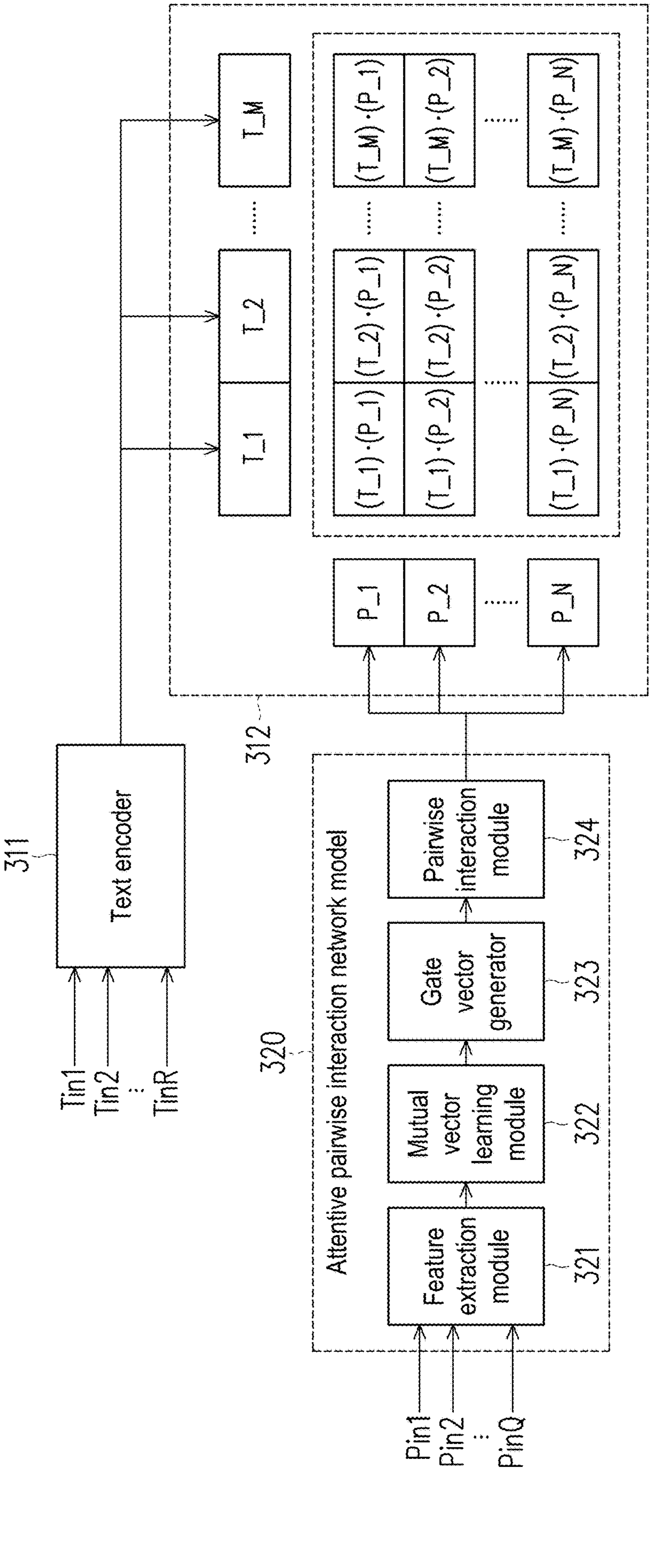
FIG. 4 is a schematic diagram of training of the identification module according to an embodiment of the disclosure.

FIG. 4 is a schematic diagram of training of the identification module according to an embodiment of the disclosure. Referring to FIG. 3 and FIG. 4, in this embodiment, the attentive pairwise interaction network model 320 may include a feature extraction module 321, a mutual vector learning module 322, a gate vector generator 323, and a pairwise interaction module 324. The feature extraction module 321 may be a convolutional neural network (CNN), which is used to extract features of the picture data input to the attentive pairwise interaction network model 320 to generate feature encoding data correspondingly. The text encoder 311 may generate multiple pieces of text encoding data T_1 to T_M, and the attentive pairwise interaction network model 320 may generate multiple pieces of attention vector encoding data P_1 to P_N, in which M and N are positive integers. The text encoding data T_1 to T_M may include at least one feature vector. The computing module 312 may perform an inner product operation according to the text encoding data T_1 to T_M and the attention vector encoding data P_1 to P_N to generate output data of multiple computation results (that is, (T_1)·(P_1) to (T_M)·(P_N)). In an embodiment, the text encoder 311 may be, for example, a transformer model, and the feature extraction module 321 may be, for example, a ResNet model, but the disclosure is not limited thereto.

In this embodiment, the identification module 121 may be trained via training data pairs in advance. The training data pairs may include first label training data Tin1, second label training data Tin2, first picture training data Pin1, and second picture training data Pin2. The first label training data Tin1 corresponds to the first picture training data Pin1, and the second label training data Tin2 corresponds to the second picture training data Pin2. In this embodiment, the first picture training data Pin1 and the second picture training data Pin2 may be selected from two pictures of multiple reference pictures (or in a training picture base) having the shortest Euclidean distance. The first label training data Tin1 and the second label training data Tin2 may be texts (or sentences) describing the first picture training data Pin1 and the second picture training data Pin2 respectively. In this embodiment, two pieces of label training data and two pieces of picture training data are used for illustration, but in other embodiments, there may be multiple pieces of label training data Tin1 to TinR and multiple pieces of picture training data Pin1 to PinQ, that is, the text encoder 311 may have R inputs and the feature extraction module 321 may have Q inputs (that is, the attentive pairwise interaction network model 320 may have Q inputs), in which R and Q are positive integers.

In this embodiment, the first label training data Tinl and the second label training data Tin2 are input to the text encoder 311 to generate text encoding data T_1 and T_2 respectively. In this embodiment, the first picture training data Pinl and the second picture training data Pin2 may be input to the attentive pairwise interaction network model 320 respectively, so that the attentive pairwise interaction network model 320 may generate attention vector encoding data P_1 to P_4. Furthermore, the text encoding data T_1 and T_2 and the multiple pieces of attention vector encoding data P_1 to P_4 may be calculated to generate multiple cross entropy loss functions. The multiple cross entropy loss functions may be added to generate a total loss function of the identification module 121 to train the text encoder 311 and the feature extraction module 321.

For example, the feature extraction module 321 may respectively generate feature encoding data correspondingly according to the first picture training data Pin1 and the second picture training data Pin2. The mutual vector learning module 322 may perform mutual learning according to the respective pieces of feature encoding data of the first picture training data Pin1 and the second picture training data Pin2 to generate a mutual learning result, in which the result may be, for example, difference features between the first picture training data Pin1 and the second picture training data Pin2. The gate vector generator 323 may compare the feature encoding data and the difference features of the first picture training data Pin1 and the second picture training data Pin2 to respectively generate gate vectors containing respective contrastive difference features. The pairwise interaction module 324 may include multiple residual attention blocks, and residual attention of each feature encoding data and each gate vector are calculated respectively to generate the attention vector encoding data P_1 to P_4 respectively.

The attention vector encoding data P_1 may be first self-attention vector encoding data representing the feature encoding data corresponding to the first picture training data Pin1 and the residual attention of the gate vector corresponding to the first picture training data Pin1, the cross entropy loss function generated when performing a picture-corresponding-to-text matrix operation on the attention vector encoding data P_1 and the text encoding data T_1 corresponding to the first label training data Tin1 may be denoted as Loss_1, and the cross entropy loss function generated when performing a text-corresponding-to-picture matrix operation may be denoted as Loss_2.

The attention vector encoding data P_2 may be first mutual-attention vector encoding data representing the feature encoding data corresponding to the first picture training data Pin1 and the residual attention of the gate vector corresponding to the second picture training data Pin2, the cross entropy loss function generated when performing the picture-corresponding-to-text matrix operation on the attention vector encoding data P_2 and the text encoding data T_1 corresponding to the first label training data Tin1 may be denoted as Loss_3, and the cross entropy loss function generated when performing the text-corresponding-to-picture matrix operation may be denoted as Loss_4.

The attention vector encoding data P_3 may be second mutual-attention vector encoding data representing the feature encoding data corresponding to the second picture training data Pin2 and the residual attention of the gate vector corresponding to the first picture training data Pin1, the cross entropy loss function generated when performing the picture-corresponding-to-text matrix operation on the attention vector encoding data P_3 and the text encoding data T_2 corresponding to the second label training data Tin2 may be denoted as Loss_5, and the cross entropy loss function generated when performing the text-corresponding-to-picture matrix operation may be denoted as Loss_6.

The attention vector encoding data P_4 may be second self-attention vector encoding data representing the feature encoding data corresponding to the second picture training data Pin2 and the residual attention of the gate vector corresponding to the second picture training data Pin2, the cross entropy loss function generated when performing the picture-corresponding-to-text matrix operation on the attention vector encoding data P_4 and the text encoding data T_2 corresponding to the second label training data Tin2 may be denoted as Loss_7, and the cross entropy loss function generated when performing the text-corresponding-to-picture matrix operation may be denoted as Loss_8.

Finally, the multiple cross entropy loss functions Loss_1 to Loss_8 may be added and averaged to generate a total loss function of the identification module 121, in which the total loss function may be used to update at least one model parameter of the text encoder 311 or the feature extraction module 321. In this way, during the iterative training process, at least one model parameter of the text encoder 311 or the feature extraction module 321 is closer and closer to a best parameter.

Figure 5:
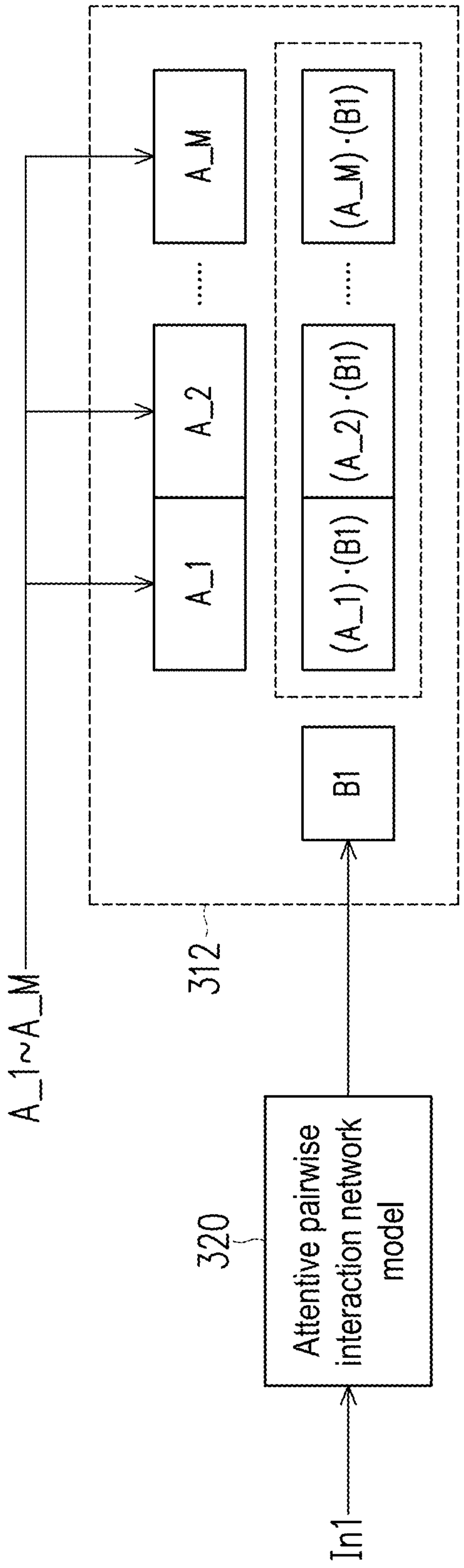
FIG. 5 is a schematic diagram of application of the identification module according to an embodiment of the disclosure.

FIG. 5 is a schematic diagram of application of the identification module according to an embodiment of the disclosure. Referring to FIG. 5, in response to input data In1 being picture data, the attentive pairwise interaction network model 320 may convert the input data In1 into encoding data B1, and the computing module 312 may read multiple text base weights A_1 to A_M pre-determined, in which M is a positive integer. The computing module 312 may perform an inner product operation (that is, (A_1)·(B1) to (A_M)·(B1)) on the encoding data B1 and the text base weights A_1 to A_M to generate multiple computation results. The text base weights A_1 to A_M may respectively correspond to text encoding data generated by M different pre-determined texts (or sentences) through the text encoder 311. The computing module 312 may use a largest value among the computation results as the output data. For example, if the input data In1 is a street view picture (or image), then the computing module 312 outputs a pre-determined text (or sentence) corresponding to the text base weight corresponding to the largest value among the computation results. In an embodiment, the input data In1 may be input to one of multiple pieces of input of the attentive pairwise interaction network model 320, while the other pieces of the multiple pieces of input of the attentive pairwise interaction network model 320 are set to receive zero matrices. A piece of the attention vector encoding data P_1 to P_N (for example, the self-attention vector encoding data corresponding to the input of the input data In1, or the attention vector encoding data with the largest vector length) generated by the attentive pairwise interaction network model 320 based on the above may be taken as the encoding data B1. In another embodiment, the attention vector encoding data P_1 to P_N generated by the attentive pairwise interaction network model 320 may be used as multiple pieces of encoding data B1 to BN (not shown in FIG. 5). Inner product operations are performed on the encoding data B1 to BN and the text base weights A_1 to A_M respectively to generate multiple computation results, and the computing module 312 then uses a largest value among the computation results as the output data.

Figure 6:
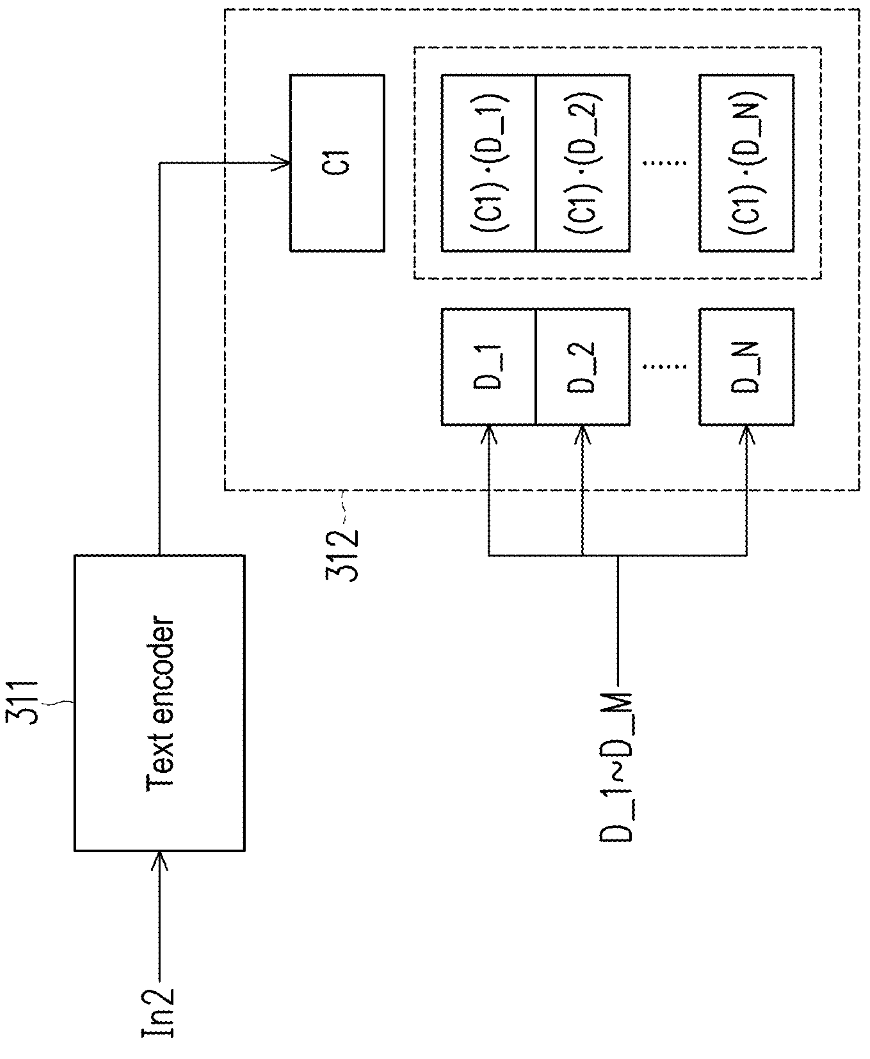
FIG. 6 is a schematic diagram of application of the identification module according to an embodiment of the disclosure.

FIG. 6 is a schematic diagram of application of the identification module according to an embodiment of the disclosure. Referring to FIG. 6, in response to input data In2 being text data, the text encoder 311 may convert the input data In2 into encoding data C1, and the computing module 312 may read multiple picture base weights D_1 to D_N pre-determined, in which N is positive integer. The computing module 312 may perform the inner product operation (that is, (C1)·(D_1) to (C1)·(D_N)) on the encoding data C1 and the picture base weight D_1 to D_N to generate multiple computation results. The picture base weights D_1 to D_N may respectively correspond to feature encoding data generated by N different pre-determined pictures (or images) through the feature extraction module 321. In another embodiment, the picture base weights D_1 to D_N may respectively correspond to attention vector encoding data generated by N different pre-determined pictures (or images) through the attentive pairwise interaction network model 320. The computing module 312 may use a largest value among the computation results as the output data. For example, if the input data In2 is a query text (or sentence), then the computing module 312 outputs a pre-determined picture (or image) corresponding to the picture base weight corresponding to the largest value among the computation results.

Figure 7:
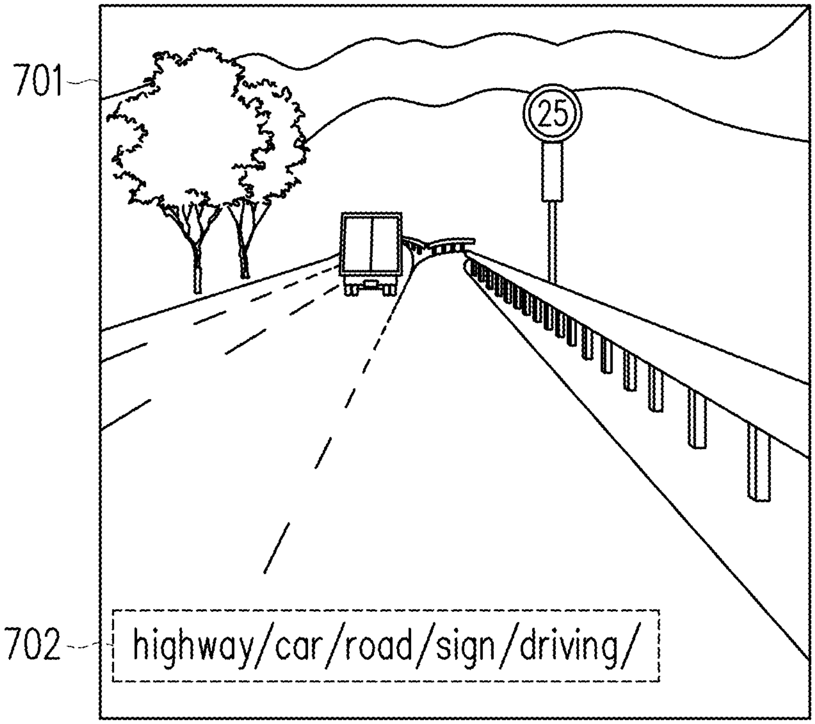
FIG. 7 is a schematic diagram of output data according to an embodiment of the disclosure.

FIG. 7 is a schematic diagram of the output data according to an embodiment of the disclosure. Referring to FIG. 1, FIG. 3, FIG. 5, and FIG. 7, in an embodiment, the storage device 120 may also store a post-processing module. The input data In2 may be, for example, picture data 701 as shown in FIG. 7, but the disclosure is not limited thereto. The picture data 701 may be, for example, a real-time vehicle condition image captured by a front camera of the vehicle. In this regard, the identification module 121 may input the picture data 701 to the attentive pairwise interaction network model 320 according to the method in FIG. 5 to output the corresponding encoding data to the computing module 312, in addition, the identification module 121 may input multiple pieces of encoding data corresponding to the multiple pre-determined sentences to the computing module 312, so that the computing module 312 performs the inner product operation. The computing module 312 may generate the output data, in which the output data includes multiple inner product calculation results. In this regard, the post-processing module may select multiple sentences corresponding to parts with highest values among the multiple inner product computation results, and select (after excluding connectives or articles) multiple repeated words 702 (may be at least one word) from the sentences.

For example, the sentences with the top three highest values may be "a car driving down a highway next to a street sign and trees on both sides of the road and a street sign", "a car driving down a highway next to a bridge and a highway sign on the side of the road", and "a car driving down a highway next to a bridge and a highway sign on the side of the road". The post-processing module may select the repeated words "highway", "car", "road", "sign", and "driving".

Furthermore, the post-processing module may generate display data according to the picture data 701 and the multiple words 702. As shown in FIG. 7, the post-processing module may overlay the multiple words 702 on the picture data 701 and display the data on, for example, a display in a vehicle. In this way, the identification system 100 can achieve real-time and effective image identification functions. In addition, in another embodiment, if text data is input, for example, the user queries about driving records, then the identification system 100 also displays matching picture data on the display in the vehicle. In other words, the identification system 100 can also implement effective image query functions.

Figure 8:
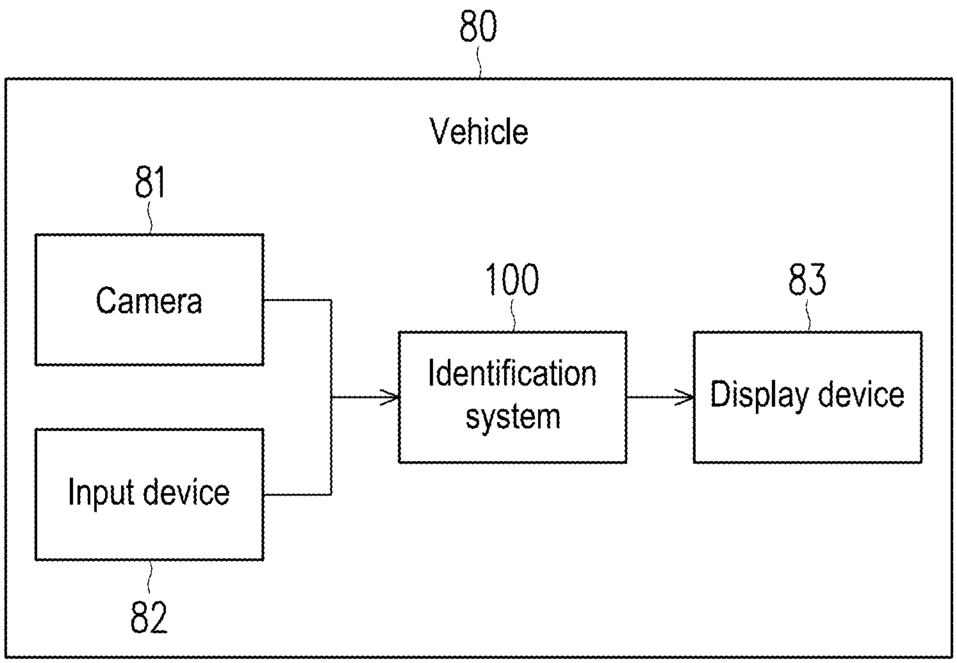
FIG. 8 is a schematic diagram of a vehicle according to an embodiment of the disclosure.

FIG. 8 is a schematic diagram of a vehicle according to an embodiment of the disclosure. Referring to FIG. 8, the identification system 100 described in various embodiments of the disclosure may be disposed on a vehicle 80. The vehicle 80 may be, for example, a car, a monitoring device, or other movable/non-movable devices. In this embodiment, the vehicle 80 may include a camera 81, an input device 82, a display device 83, and the identification system 100. In this regard, the input data may be provided by the camera 81 or the input device 82. The camera 81 may be, for example, a car lens or a driving recorder. The input device 82 may be, for example, an input interface of a touch panel, a virtual key, or a physical key unit. The display device 83 may be, for example, a vehicle display, and may, for example, integrate a touch panel to provide a display touch function.

In an embodiment, the identification system 100 may be implemented as, for example, a street view prompting system. The input data may be a current street view picture provided by the camera 81, and the display device 83 may display the current street view picture. The identification system 100 may identify picture content in the current street view picture, and overlay and display reminder words on the current street view picture according to the picture content and pre-determined reminder words. The pre-determined reminder words may be, for example, a parking lot or a gas station, and the disclosure is not limited thereto.

In an embodiment, the identification system 100 may be implemented as, for example, an accident alarm system. The input data may be the current driving image provided by the camera 81, and the display device 83 may display the current driving image. The identification system 100 may identify image content in the current driving image, and generate warning sentences according to the image content. The identification system 100 may overlay the warning sentences on the current driving image. The warning sentences may be, for example, about landslides, vehicle congestion, crowd chaos, or tree collapse, and the disclosure is not limited thereto.

In an embodiment, the identification system 100 may be implemented as, for example, a driving record query system. The input data may be input information provided by the input device 82, such as keyword information. The identification system 100 may identify text in the input information and query previously recorded picture or image content (that is, driving image record) according to the text. The identification system 100 may display the queried pictures or images through the display device 83. The keyword information may be, for example, "pedestrians on the street" or "traffic signs", and the disclosure is not limited thereto.

In summary, the identification system and the identification method of the disclosure can effectively identify picture data and text data, and can be applied in the driving environment to provide real-time and effective identification, reminder, and warning functions of the driving images, and can also provide an effective image query function. The identification module of the disclosure may be implemented by combining the contrastive language-image pre-training model and the attentive pairwise interaction network model.

Although the disclosure has been disclosed above through embodiments, the embodiments are not intended to limit the disclosure. Persons with ordinary knowledge in the relevant technical field may make some changes and modifications without departing from the spirit and scope of the disclosure. Therefore, the protection scope of the disclosure shall be determined by the appended claims.

What is claimed is:

1. An identification system, comprising:

a storage device, configured to store an identification module, wherein the identification module comprises a text encoder and an attentive pairwise interaction network model; and a processor, coupled to the storage device, and configured to execute the identification module, wherein the processor inputs input data to the identification module, so that the identification module generates encoding data according to the input data, wherein the processor is further configured to use the encoding data output by the text encoder or the attentive pairwise interaction network model of the identification module to generate output data according to the input data, wherein in response to the input data being text data, the output data is picture data, and in response to the input data being the picture data, the output data is the text data, wherein in response to the input data being the text data, the text encoder converts the input data into the encoding data, and the processor reads a plurality of picture base weights pre-determined, wherein in response to the input data being the picture data, the attentive pairwise interaction network model converts the input data into the encoding data, and the processor reads a plurality of text base weights pre-determined, wherein the processor generates a plurality of computation results by performing a plurality of inner product operations on the encoding data and the plurality of picture base weights or the plurality of text base weights, and the processor uses a largest value among the computation results as the output data.

2. The identification system according to claim 1, wherein the attentive pairwise interaction network model comprises a plurality of pieces of input, the picture data is input to one of the plurality of pieces of input of the attentive pairwise interaction network model, while the other pieces of the plurality of pieces of input of the attentive pairwise interaction network model receive zero matrices.

3. The identification system according to claim 1, wherein the output data comprises a plurality of inner product calculation results, wherein in response to the input data being the picture data, the processor selects a plurality of sentences corresponding to parts with highest values among the inner product calculation results, select at least one word repeated from the sentences, and the processor generates display data according to the picture data and the at least one word.

4. The identification system according to claim 1, wherein the attentive pairwise interaction network model comprises a feature extraction neural network, and the feature extraction neural network extracts features of the picture data input to the attentive pairwise interaction network model to generate feature encoding data correspondingly.

5. The identification system according to claim 4, wherein the identification module is trained via a training data pair, the training data pair comprises first label training data, second label training data, first picture training data, and second picture training data; the first label training data corresponds to the first picture training data, and the second label training data corresponds to the second picture training data.

6. The identification system according to claim 5, wherein the attentive pairwise interaction network model generates a plurality of pieces of attention vector encoding data according to the first picture training data and the second picture training data; the first label training data; and the second label training data, and the plurality of pieces of attention vector encoding data are calculated to generate a plurality of cross entropy loss functions, wherein the cross entropy loss functions are added and averaged to generate a total loss function of the identification module, and the total loss function is configured to update at least one model parameter of the text encoder or the feature extraction neural network.

7. The identification system according to claim 5, wherein the first picture training data and the second picture training data are selected from two pictures of a plurality of reference images having a shortest Euclidean distance.

8. The identification system according to claim 1, wherein the identification system is disposed on a vehicle, the vehicle comprises a camera and an input device, and the input data is provided by the camera or the input device.

9. An identification method, comprising:

executing an identification module, by a processor, wherein the identification module comprises a text encoder and an attentive pairwise interaction network model;

inputting input data to the identification module, by a processor, wherein the input data is one of text data and picture data; and generating encoding data according to the input data by the identification module, using encoding data output by the text encoder or the attentive pairwise interaction network model of the identification module as input data, and generating output data according to the input data by the processor, wherein in response to the input data being the text data, the output data is the picture data, and in response to the input data being the picture data, the output data is the text data, wherein generating the output data comprises:

converting, by the text encoder, the input data into the encoding data, and reading, by the processor, a plurality of picture base weights pre-determined in response to the input data being the text data;

converting, by the attentive pairwise interaction network model, the input data into the encoding data, and reading, by the processor, a plurality of text base weights pre-determined in response to the input data being the picture data;

performing a plurality of inner product operations, by the processor, on the encoding data and the plurality of picture base weights or the plurality of text base weights to generate a plurality of computation results; and using, by the processor, a largest value among the computation results as the output data.

10. The identification method according to claim 9, wherein the attentive pairwise interaction network model comprises a plurality of pieces of input, the picture data is input to one of the plurality of pieces of input of the attentive pairwise interaction network model, while the other pieces of the plurality of pieces of input of the attentive pairwise interaction network model receive zero matrices.

11. The identification method according to claim 9, wherein the output data comprises a plurality of inner product calculation results, and the identification method further comprises:

in response to the input data being the picture data, selecting, by the processor, a plurality of sentences corresponding to parts with highest values among the inner product computation results, and selecting at least one word repeated from the sentences; and generating, by the processor, display data according to the picture data and the at least one word.

12. The identification method according to claim 9, wherein the attentive pairwise interaction network model comprises a feature extraction neural network, and the feature extraction neural network extracts features of the picture data input to the attentive pairwise interaction network model to generate feature encoding data correspondingly.

13. The identification method according to claim 12, further comprising:

training the identification module via a training data pair, wherein the training data pair comprises first label training data, second label training data, first picture training data, and second picture training data; and the first label training data corresponds to the first picture training data, and the second label training data corresponds to the second picture training data.

14. The identification method according to claim 13, wherein training the attentive pairwise interaction network model comprises:

generating, by the attentive pairwise interaction network model, a plurality of pieces of attention vector encoding data according to the first picture training data and the second picture training data;

calculating a plurality of cross entropy loss functions according to the first label training data, the second label training data, and the plurality of pieces of attention vector encoding data;

adding and averaging the cross entropy loss functions to generate a total loss function; and updating at least one model parameter of the text encoder or the feature extraction neural network according to the total loss function.

15. The identification method according to claim 13, wherein the first picture training data and the second picture training data are selected from two pictures of a plurality of reference images having a shortest Euclidean distance.

16. The identification method according to claim 9, wherein the input data is provided by a camera or an input device disposed on a vehicle.

* * * * *